US009742957B2

(12) United States Patent
Shiratori (10) Patent No.: US 9,742,957 B2
(45) Date of Patent: Aug. 22, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kana Shiratori, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/014,185

(22) Filed: Feb. 3, 2016

(65) Prior Publication Data

US 2017/0019565 A1 Jan. 19, 2017

(30) Foreign Application Priority Data

Jul. 14, 2015 (JP) .................................. 2015-140649

(51) Int. Cl.
G06F 15/00 (2006.01)
H04N 1/44 (2006.01)
G06F 3/12 (2006.01)
H04N 1/00 (2006.01)

(52) U.S. Cl.
CPC ......... *H04N 1/4413* (2013.01); *G06F 3/1204* (2013.01); *G06F 3/1205* (2013.01); *G06F 3/1257* (2013.01); *G06F 3/1285* (2013.01); *H04N 1/00204* (2013.01); *H04N 1/444* (2013.01); *G06F 3/1239* (2013.01); *H04N 2201/0094* (2013.01)

(58) Field of Classification Search
None
See application file for complete search history.

(56) References Cited

U.S. PATENT DOCUMENTS

2013/0139071 A1* 5/2013 Hoff .................. G06Q 10/1095
715/756
2016/0011821 A1* 1/2016 Tomihisa .............. G06F 3/1204
358/1.13

FOREIGN PATENT DOCUMENTS

JP 2004-243588 A 9/2004
JP 2005-050047 A 2/2005
JP 2014-154072 A 8/2014
(Continued)

OTHER PUBLICATIONS

Communication dated Dec. 16, 2016 from the European Patent Office in counterpart Application No. 16157532.9.

*Primary Examiner* — Helen Q Zong
(74) *Attorney, Agent, or Firm* — Sughrue Mion, PLLC (57) ABSTRACT

An information processing apparatus includes a reception unit, an attribute acquisition unit, and a determination unit. The reception unit receives registration of a document to be printed. The document is registered in correlation with an event. The attribute acquisition unit acquires attribute information on each participant in the event corresponding to the document to be printed. The attribute information is acquired from a user attribute storage device that stores attribute information on each person at a determination timing when print setting for the participant for the document to be printed is determined. The determination unit determines, on the basis of the attribute information on the participant acquired by the attribute acquisition unit, print setting to be applied when the participant prints the document to be printed.

8 Claims, 9 Drawing Sheets

(56) References Cited

FOREIGN PATENT DOCUMENTS

| JP | 2015-60265 A | 3/2015 |
|----|--------------|--------|
| WO | 00/68817 A1 | 11/2000 |

* cited by examiner

| EMPLOYEE NUMBER | NAME | DEPARTMENT | EXTENSION NUMBER | E-MAIL ADDRESS | TITLE |
|---|---|---|---|---|---|
| 00001 | TARO YAMADA | SALES DEPARTMENT | xxx-xxxx | tarou.yamada@mail.com | REGULAR EMPLOYEE |
| 00002 | HANAKO FUJI | SALES DEPARTMENT | ooo-oooo | hanako.fuji@mail.com | REGULAR EMPLOYEE |
| 00003 | MARUO SUZUKI | RESEARCH AND TECHNOLOGICAL DEVELOPMENT DEPARTMENT | △△△-△△△△ | jirou.tanaka@mail.com | SECTION MANAGER |
| 00004 | BATSUKO SATO | PRODUCTION DEPARTMENT | ◇◇◇-◇◇◇◇ | sakurako.suzuki@mail.com | DIVISION MANAGER |
| ... | ... | ... | ... | ... | ... |

FIG. 3

| MEETING ID | SUBJECT MATTER (MEETING NAME) | DATE AND TIME | LOCATION | REQUESTING PERSON | PARTICIPANT LIST | MATERIAL |
|---|---|---|---|---|---|---|
| 01234 | XXX COMMERCIALIZATION DEVELOPMENT MEETING | FROM 13:00, 4/1/2015 TO 14:00, 4/1/2015 | MEETING ROOM NO. 5, 10TH FLOOR | TARO YAMADA | TARO YAMADA, HANAKO FUJI, MARUO SUZUKI, AND BATSUKO SATO | aaa.pdf |
| ... | ... | ... | ... | ... | ... | ... |

FIG. 4

| | | 100 |
|---|---|---|
| REQUESTING PERSON | TARO YAMADA | |
| PARTICIPANT | TARO YAMADA, HANAKO FUJI, MARUO SUZUKI, AND BATSUKO SATO | |
| SUBJECT MATTER | XXX COMMERCIALIZATION DEVELOPMENT MEETING | |
| LOCATION | MEETING ROOM NO. 5, 10TH FLOOR | |
| START TIME | 13:00, 4/1/2015 | |
| END TIME | 15:00, 4/1/2015 | |

PDF —112

| ORDER OF PRIORITY | PRINT SETTING PARAMETER | LEVEL 1 (HIGHEST LEVEL) | LEVEL 2 | LEVEL 3 | ... | LEVEL m |
|---|---|---|---|---|---|---|
| 001 | COLLECTIVE PRINT | 1 up | 2 up | 4 up | ... | NULL |
| 002 | DOUBLE-SIDED PRINT | SINGLE-SIDED | DOUBLE-SIDED | NULL | ... | NULL |
| 003 | COLOR MODE | COLOR | MONOCHROME | NULL | ... | NULL |
| 004 | PAGE RANGE DESIGNATION | ALL | EXCLUDING Appendix | CHAPTER 3 ONLY | ... | NULL |
| 005 | TOTAL AMOUNT | NULL | NULL | 500 | ... | 10 |
| ... | ... | ... | ... | ... | ... | ... |

FIG. 8

| DOCUMENT ID | PERSON OF REGISTRATION | MEETING ID | PARTICIPANT LIST | DEFAULT PRINT SETTING |
|---|---|---|---|---|
| 135791 | 00001 | 01234 | TARO YAMADA, HANAKO FUJI, MARUO SUZUKI, AND BATSUKO SATO | COLLECTIVE PRINT = LEVEL 3, DOUBLE-SIDED PRINT = LEVEL 2, PAGE RANGE DESIGNATION = LEVEL 3, ... |
| ... | ... | ... | ... | ... |

FIG. 9

| EMPLOYEE NUMBER | DOCUMENT ID | MEETING ID | ATTRIBUTE INFORMATION ON PARTICIPANT | PRINT SETTING |
|---|---|---|---|---|
| 00001 | 135791 | 01234 | SALES DEPARTMENT REGULAR EMPLOYEE | 4 up, DOUBLE-SIDED, MONOCHROME, CHAPTER 3 ONLY, 500 YEN, ... |
| ... | ... | ... | ... | ... |

| PARTICIPANT EMPLOYEE NUMBER | PROXY EMPLOYEE NUMBER | DOCUMENT ID | MEETING ID | ATTRIBUTE INFORMATION ON PARTICIPANT | PRINT SETTING |
|---|---|---|---|---|---|
| 00001 | NULL | 135791 | 01234 | SALES DEPARTMENT REGULAR EMPLOYEE | 4 up, DOUBLE-SIDED, MONOCHROME, CHAPTER 3 ONLY, 500 YEN, ... |
| 00002 | NULL | 135791 | 01234 | SALES DEPARTMENT REGULAR EMPLOYEE | 4 up, DOUBLE-SIDED, MONOCHROME, CHAPTER 3 ONLY, 500 YEN, ... |
| 00003 | 00012 | 135791 | 01234 | RESEARCH AND TECHNOLOGICAL DEVELOPMENT DEPARTMENT SECTION MANAGER | 1 up, SINGLE-SIDED, MONOCHROME, CHAPTER 3 ONLY, 500 YEN, ... |
| ... | ... | ... | ... | ... | ... |

FIG. 12

| EMPLOYEE NUMBER | DOCUMENT ID | MEETING ID | ATTRIBUTE INFORMATION ON PARTICIPANT | PRINT SETTING | RESERVATION NUMBER |
|---|---|---|---|---|---|
| 00001 | 135791 | 01234 | SALES DEPARTMENT REGULAR EMPLOYEE | 4 up, DOUBLE-SIDED, MONOCHROME, CHAPTER 3 ONLY, 500 YEN, ... | 123456789 |
| ... | ... | ... | ... | ... | ... |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-140649 filed Jul. 14, 2015.

BACKGROUND

Technical Field

The present invention relates to an information processing apparatus, an information processing method, and a non-transitory computer readable medium.

SUMMARY

According to an aspect of the present invention, there is provided an information processing apparatus including: a reception unit that receives registration of a document to be printed, the document being registered in correlation with an event; an attribute acquisition unit that acquires attribute information on each participant in the event corresponding to the document to be printed, the attribute information being acquired from a user attribute storage device that stores attribute information on each person at a determination timing when print setting for the participant for the document to be printed is determined; and a determination unit that determines, on a basis of the attribute information on the participant acquired by the attribute acquisition unit, print setting to be applied when the participant prints the document to be printed.

BRIEF DESCRIPTION OF THE DRAWINGS

An Exemplary embodiment of the present invention will be described in detail based on the following figures, wherein.

DETAILED DESCRIPTION

Figure 1:
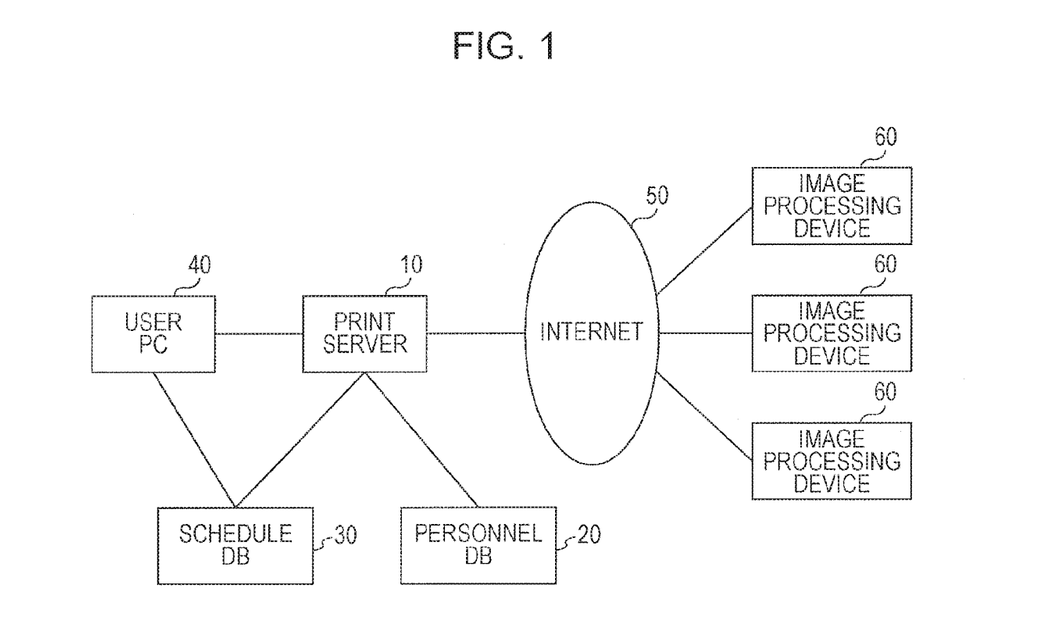
FIG. 1 illustrates an example of the configuration of a system according to an exemplary embodiment.

FIG. 1 illustrates an example of a system according to an exemplary embodiment. The system includes a print server 10, a personnel database (DB) 20, a schedule database (DB) 30, a user personal computer (PC) 40, and image processing devices 60.

In the exemplary embodiment, a document to be used in a meeting at a certain company is to be printed. The print server 10, the personnel DB 20, the schedule DB 30, and the user PC 40 are provided in an intranet of the company. The image processing device 60 may be provided in the intranet, or may access the print server 10 via the Internet 50.

The user PC 40 is a personal computer of each employee.

The image processing device 60 is a device that executes image processing including printing, and may be a single-function device for printing or a multi-function device with plural image processing functions such as scanning and facsimile functions besides printing. The image processing device 60 has a user interface (UI) through which an operation is received from a user, and accesses the print server 10 via a data communication network such as the Internet 50 and a local area network in response to an instruction provided from the user to the UI. Then, the image processing device 60 acquires an electronic document (hereinafter referred to simply as a "document") selected by the user, among documents which are stored in the print server 10 and for which the user has the authority to print, from the print server 10 along with information on print setting, and prints the document in accordance with the print setting on a medium such as paper.

The print server 10 receives an instruction for registration of a document to be printed, print setting for the document, etc. from a client device such as the user PC 40 to control a print process for the registered document. A user (person of registration) who registers a document in the print server 10 may designate users who may print (have the authority to print) the document. In addition, in response to a request from the image processing device 60 received via the Internet 50 or the like, the print server 10 provides the image processing device 60 with information on a list of documents that a user who operates the image processing device 60 may print. Then, the print server 10 provides the image processing device 60 with the document selected by the user from the list information along with information on the print setting corresponding to the document. The print server 10 determines the print setting to be provided to the image processing device 60 along with the document with reference to the personnel DB 20 and the schedule DB 30. The process for determining the print setting will be described in detail later.

Figure 2:
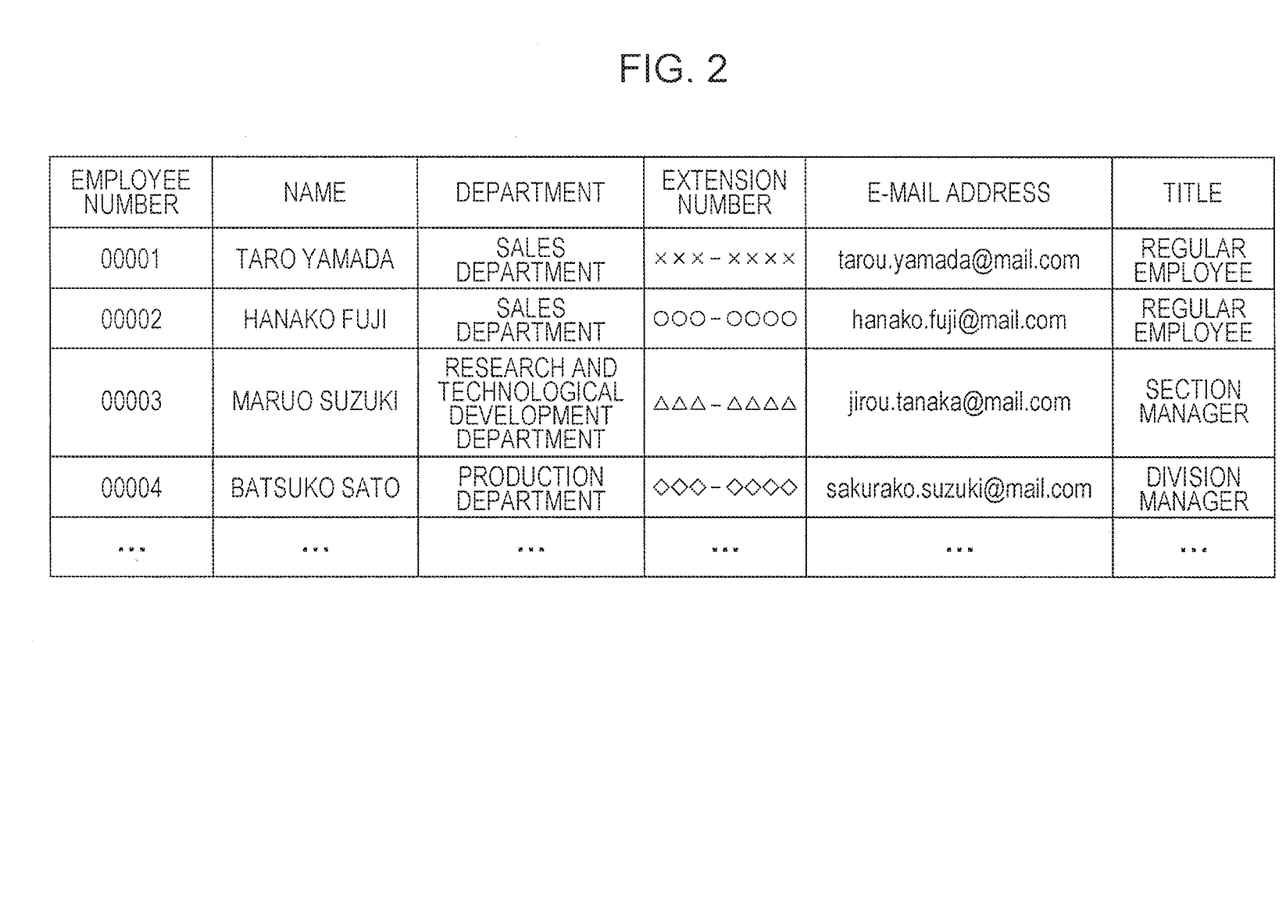
FIG. 2 illustrates an example of data stored in a personnel database (DB)

The personnel DB 20 is a database that stores information on the personnel of the company. FIG. 2 illustrates an example of the content of data stored in the personnel DB 20. Each row indicated in FIG. 2 indicates attribute information on one employee of the company. The attribute information on each employee include attribute items such as employee number, name, department to which he/she belongs, extension number, e-mail address, and title.

Figure 3:
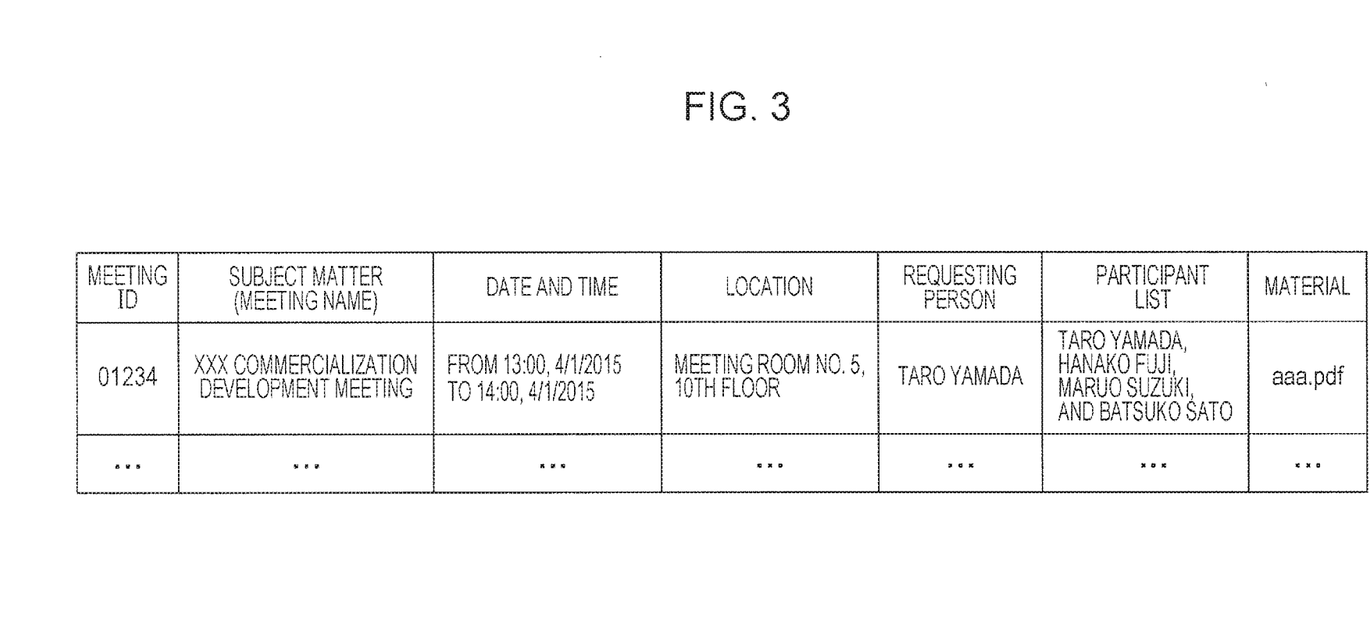
FIG. 3 illustrates an example of meeting information registered in a schedule database (DB)

The schedule DB 30 is a database that stores a schedule of employees and departments of the company. In the scenario described herein, in particular, the schedule DB 30 stores a schedule of meetings. FIG. 3 illustrates an example of meeting information stored in the schedule DB 30. Each row illustrated in FIG. 3 indicates information on one meeting, and includes items such as meeting identification information (ID), subject matter, date and time, location, requesting person, participant list, and material. The "meeting ID" is identification information for uniquely identifying each meeting. The "subject matter" is the name of the meeting. The "requesting person" is the user who has registered the meeting in the schedule DB 30. In the illustration, the name of the requesting user is indicated in the requesting person field for ease of understanding. In practice, however, the employee number of the requesting user is stored in the field. The participant list is a list of participants who will participate in the meeting. In the illustration, the participant list includes the names of the participants. In practice, however, the employee numbers of the participants are stored as with the requesting person. The "material" is a document registered by the requesting user as a material for the meeting. The participants included in the participant list have the authority to print the document stored in the "material" field.

Figure 4:
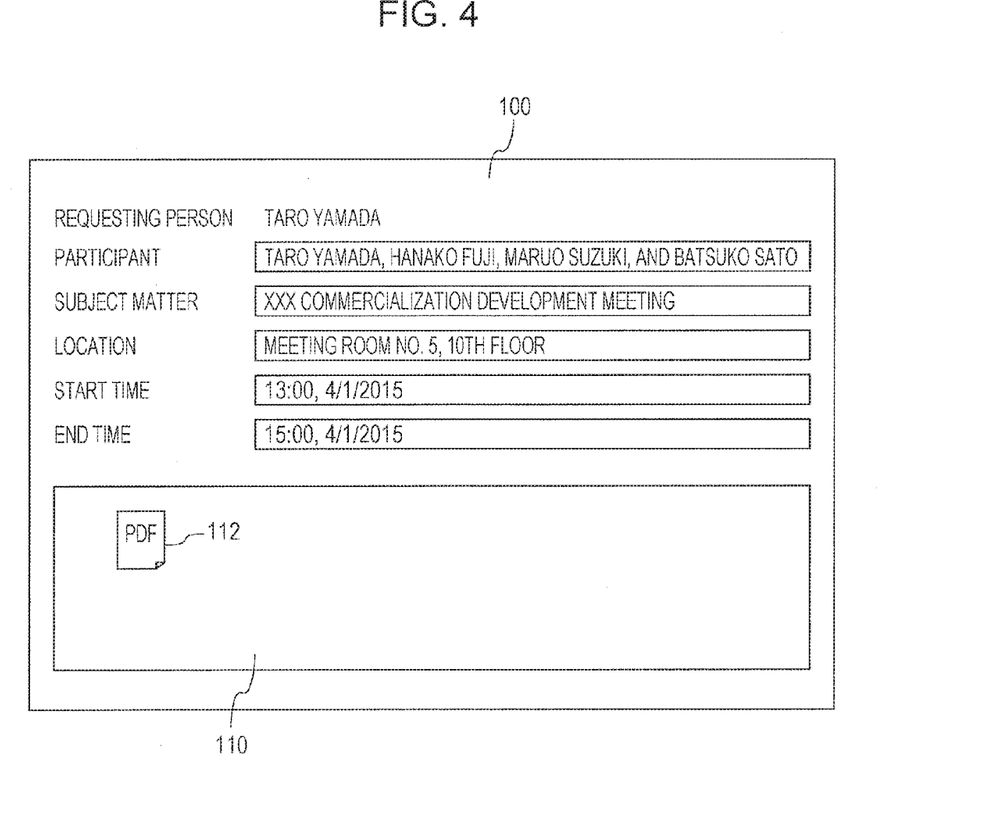
FIG. 4 illustrates an example of a meeting registration screen.

Registration of a meeting in the schedule DB 30 is performed using a meeting registration screen 100 illustrated in FIG. 4, for example. When the requesting user accesses the schedule DB 30 from his/her user PC 40 to perform an operation for registering a new meeting, the user PC 40 is provided with the meeting registration screen 100 with the name of the user entered in the "requesting person" field. The requesting user inputs participants to the "participant" field on the meeting registration screen 100, and inputs "subject matter" (meeting name), location, start time, and end time. If there is any material for the meeting, a file 112 of the material is registered in an attached material field 110 through an operation such as a drag-and-drop operation, for example. When the user inputs required information to the meeting registration screen 100 and instructs registration, a meeting information entry that includes the input values for the items is stored in the schedule DB 30. At this time, the schedule DB 30 may transmit a meeting participation request that includes information on the meeting (such as subject matter, date and time, location, and participants) to each designated participant by electronic mail or the like. Such registration and notification for the meeting may be performed using the related art, and will not be described any further.

The material document registered in the schedule DB 30 is registered in the print server 10 from the schedule DB 30, for example. Alternatively, when the requesting user accesses the print server 10 and designates the material document for the meeting registered in the schedule DB 30 as a document to be printed, the print server 10 acquires the document from the schedule DB 30. In either case, the user PC 40 of the requesting user is provided with a print setting screen from the print server 10, and the requesting user sets the values of the items (such as collective print and double-sided/single-sided print) for print setting on the screen. The print setting to be applied in the case where a participant in the meeting prints the document is determined on the basis of the print setting made by the requesting user and the attribute information on the participant stored in the personnel DB 20. In the following example, the print setting to be applied to a participant is determined on the basis of the department to which the participant belongs and the title of the participant.

Figure 5:
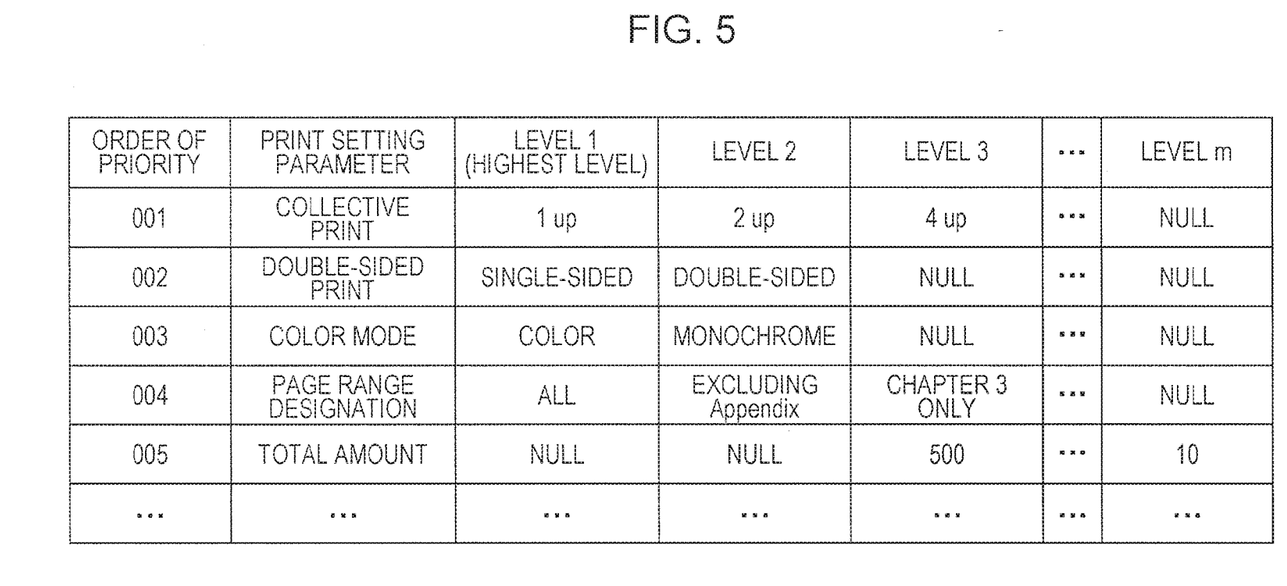
FIG. 5 illustrates an example of print setting level definition information.
Figure 6:
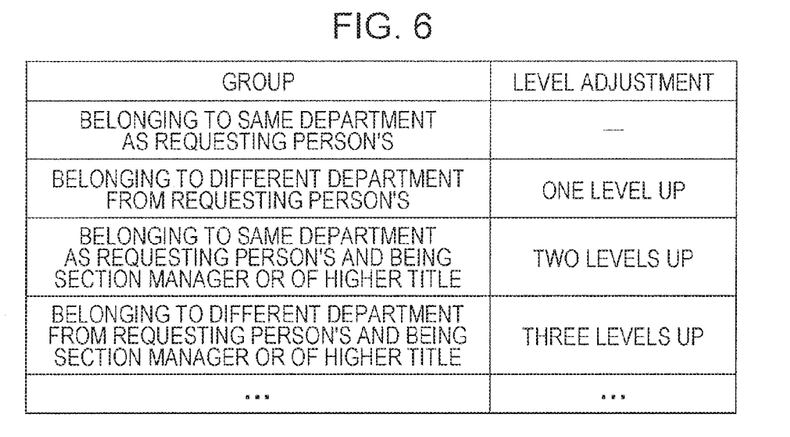
FIG. 6 illustrates an example of level adjustment rules for adjusting the print setting level in accordance with the user attribute.

In order to determine the print setting, the print server 10 stores print setting level definition information illustrated in FIG. 5 and level adjustment rules illustrated in FIG. 6.

In the print setting level definition information (FIG. 5), the values of print setting parameters (items) are arranged in the order of level for each parameter. Level 1 is the highest level, and the level becomes lower as the value of the level becomes larger. Values set for higher levels involve higher print charges (i.e. higher costs). For example, "collective print" is determined such that level 1 corresponds to "1 up", level 2 corresponds to "2 up", and so forth. N up (N is a positive integer) means that N logical pages are printed side by side on one page of paper. The order of priority is set for the parameters. The order of priority is the order in which level adjustment is applied. When the values of the parameters are adjusted by a level adjustment width determined in accordance with level adjustment rules to be discussed later, the values of the parameters are leveled up in the order of priority of the parameters (in the ascending order of "order of priority" value) until the adjustment width is used up (a specific example will be discussed later).

The level adjustment rules (FIG. 6) are used to make an adjustment to the default print setting input by the user (requesting user) who has registered a document in accordance with the attribute information on the user (a participant in the meeting) who prints the document. Print setting obtained by making an adjustment to the default print setting in accordance with the rules is applied when a participant in the meeting prints the document. The rules indicated in FIG. 6 group participants on the basis of a combination of the department to which each participant belongs and the title of each participant, and a level adjustment width is prescribed for each group. The default group is a group of users who meet a condition of "belonging to the same department as the requesting user's and being a regular employee". In the case where a participant falls within this group, the default print setting is used as it is. In other words, the default print setting is set on the assumption of this group.

In the example of FIG. 6, in addition, for a group of users who meet a condition of "belonging to a different department from the requesting user's and being a section manager or of a higher title", a level adjustment is made to "three levels up". This rule means that for a participant who belongs to the group of users who meet the condition, the values are leveled up from the default print setting by three levels in total, the leveling up preferentially starting from parameters of higher orders of priority. For example, in the case where the default print setting is defined as "collective print"=4 up, "double-sided print"=double-sided, "color mode"=monochrome, . . . , the values of the parameters may be leveled up by three levels in the order of priority as follows. First, the value for "collective print", which is of the highest order of priority, is leveled up by two levels to 1 up, and the value for "double-sided print", which is of the second highest order of priority, is leveled up by the remaining one level to "single-sided". Now, the parameter values have been leveled up by a total of three levels, and thus the parameter "color mode"=monochrome and the parameters of lower orders of priority are not changed. The level adjustment method described above is merely exemplary.

The print server 10 determines the print setting to be actually applied to a meeting participant with reference to the print setting level definitions (FIG. 5) and the level adjustment rules (FIG. 6) described above. In the exemplary embodiment, the print setting for the meeting participant is changed in accordance with changes in attribute (such as department and title) of the meeting participant that may occur since the first registration of the meeting until the actual holding of the meeting.

In the example, the print setting level definitions (FIG. 5) and the level adjustment rules (FIG. 6) are common setting information to be applied to all the users that use the print server 10. Such information is developed by a system administrator, and registered in the print server 10. It should be noted, however, that a user who has registered a document may register print setting level definitions and level adjustment rules for the document.

Next, an example of a process performed when the print server 10 has received registration of a document for a meeting will be described with reference to FIG. 7.

In the procedure, when the requesting user registers a meeting in the schedule DB 30 and registers a document as a material for the meeting, an instruction for registration of a document to be printed is sent from the schedule DB 30 to the print server 10. The print server 10 receives the document registration instruction (S10), and provides the user PC 40 of the requesting user with an input screen for print setting for the document. Then, the print server 10 receives input of print setting from the user (S12). The input reception may be performed by allowing the user to select a parameter value for each parameter of the print setting, for example. Next, the print server 10 acquires a list of participants in the meeting from the schedule DB 30 (S14). The acquired list includes information on the employee number of each participant. Next, the print server 10 acquires attribute information on each participant from the personnel DB 20 using the employee number (S16). Then, the participants are grouped (that is, the group to which each participant belongs is determined) by applying the acquired attribute information on each participant to grouping based on the level adjustment rules (FIG. 6) (S18). Then, it is determined whether or not plural groups have been formed as a result of the grouping (S20). In the case where plural groups have been formed, it is determined that the print setting input in S12 is the default print setting, and print setting for each group is determined by applying a level adjustment for each group prescribed in the level adjustment rules to the default print setting (S22).

Figure 8:
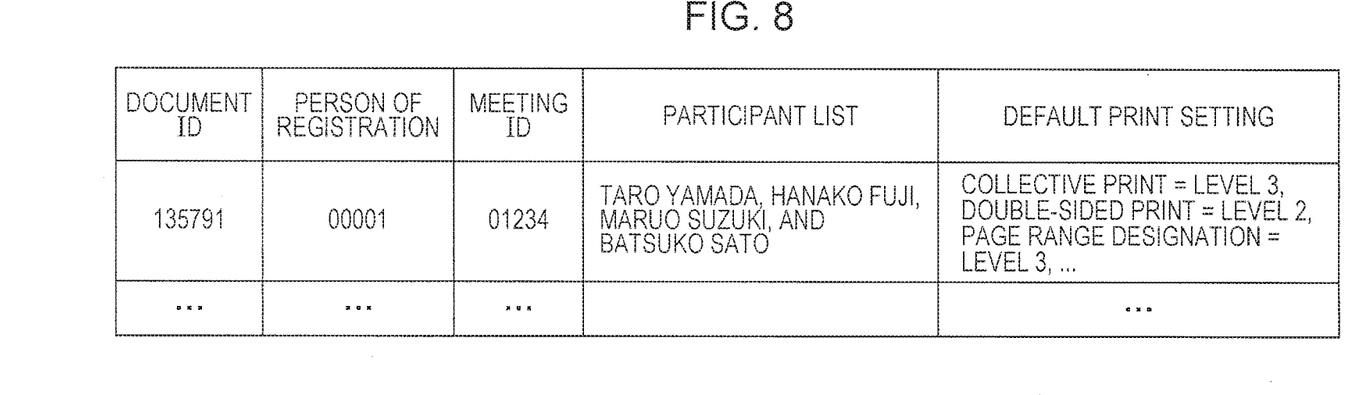
FIG. 8 illustrates an example of management information for each document.

At this time, the print server 10 stores the default print setting as a part of management information on the document. An example of the document management information stored at this time is illustrated in FIG. 8. In the example, information such as the employee number ("person of registration") of the user who has registered the document (in the example, the requesting user who has registered the meeting), the meeting ID, the list of participants in the meeting, and the default print setting is registered in correlation with a unique document ID provided to the document by the print server 10. The person of registration, the meeting ID, and the participant list are provided from the schedule DB 30 in S10, for example. The person of registration has the authority to change the default print setting. In the case where it is revealed from information on the person of registration that the user who has logged in is the person of registration of the document, the print server 10 provides the user with a UI screen for changing the default print setting for the document. In the example, in addition, the default print setting is stored in the form of the value of the level of each parameter in the print setting level definitions (FIG. 5).

Figure 9:
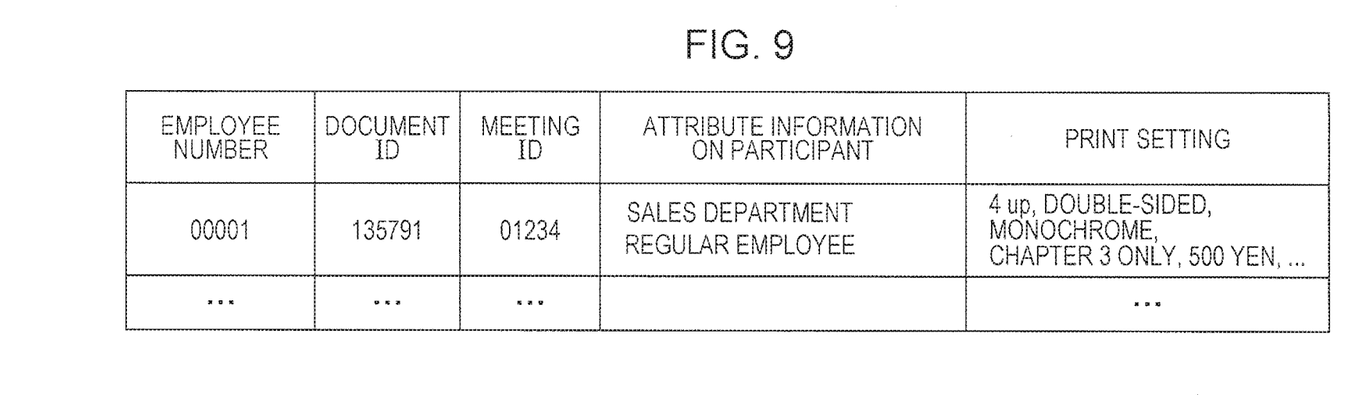
FIG. 9 illustrates an example of management information for each meeting participant.

In another example, the print server 10 stores the print setting for each group determined in S22 as print management information on each participant that belongs to that group. An example of the print management information is illustrated in FIG. 9. The print management information includes, as registered in correlation with the employee number of a participant in the meeting, information such as the document ID of a document registered in correlation with the meeting, the meeting ID of the meeting, the attribute information on the participant (acquired in S16), and the print setting for the document (determined in S22; the print setting for the group to which the participant belongs). The attribute information on the participant registered in the print management information may include only items required for grouping.

Figure 10:
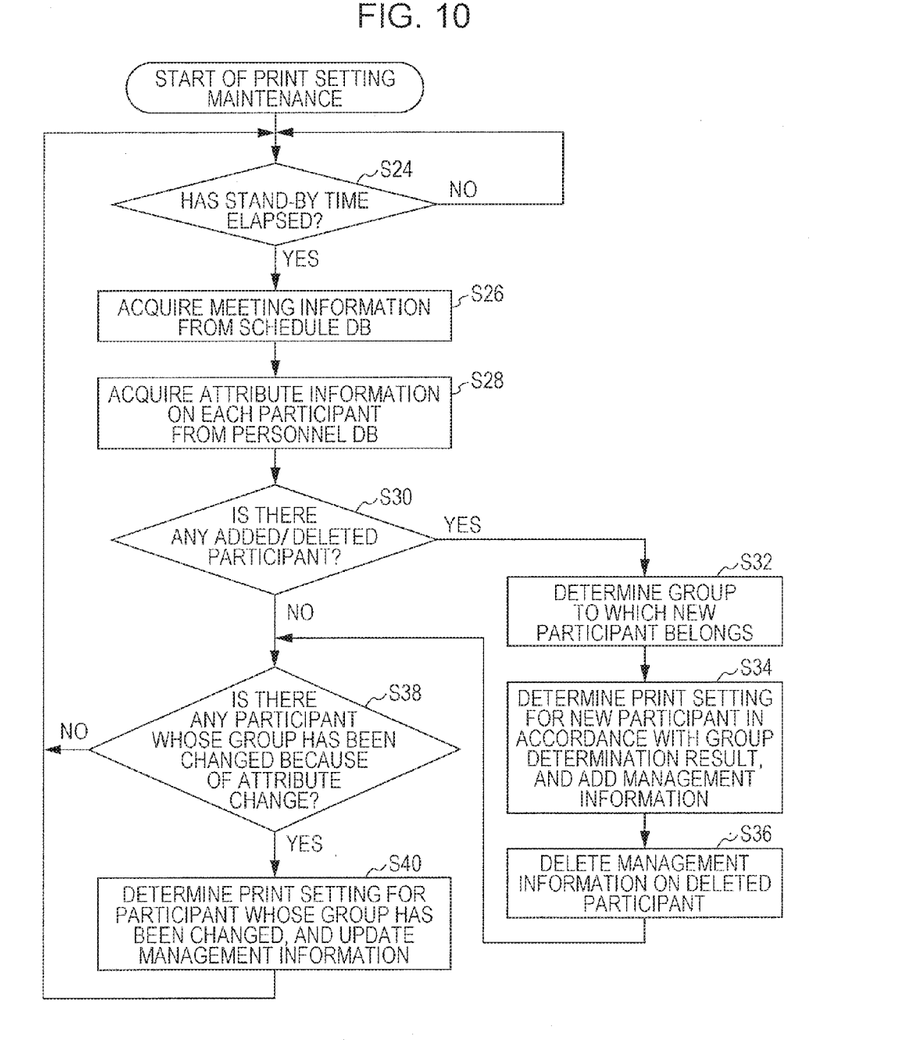
FIG. 10 illustrates an example of a process procedure for maintaining print setting after document registration.

In the case where only one group is formed (that is, all the participants belong to the same group) in the grouping process in S18, the print setting input in S12 is rendered as the print setting for the group, and the process proceeds to S24 of FIG. 10. In this case, the print server 10 integrates the print setting into the print management information on each meeting participant acquired in S14. At this time, the print server 10 may acquire, from the print setting, print setting for a reference group (the group in the uppermost row with no adjustment) in the level adjustment rules (FIG. 6), that is, the default print setting, and integrate the acquired print setting into the management information on the document. For example, the default print setting may be determined by determining the level adjustment for the group on the basis of the level adjustment rules and adjusting the print setting input in S12 in reverse for the determined level adjustment.

An example of the process performed by the print server 10 when new registration of a document has been received has been described above. In the case where a change of the default print setting for the document has been made by the person of registration after the registration, the print server 10 may reflect the change in the management information (FIG. 8) on the document, and perform the process in S22.

Figure 7:
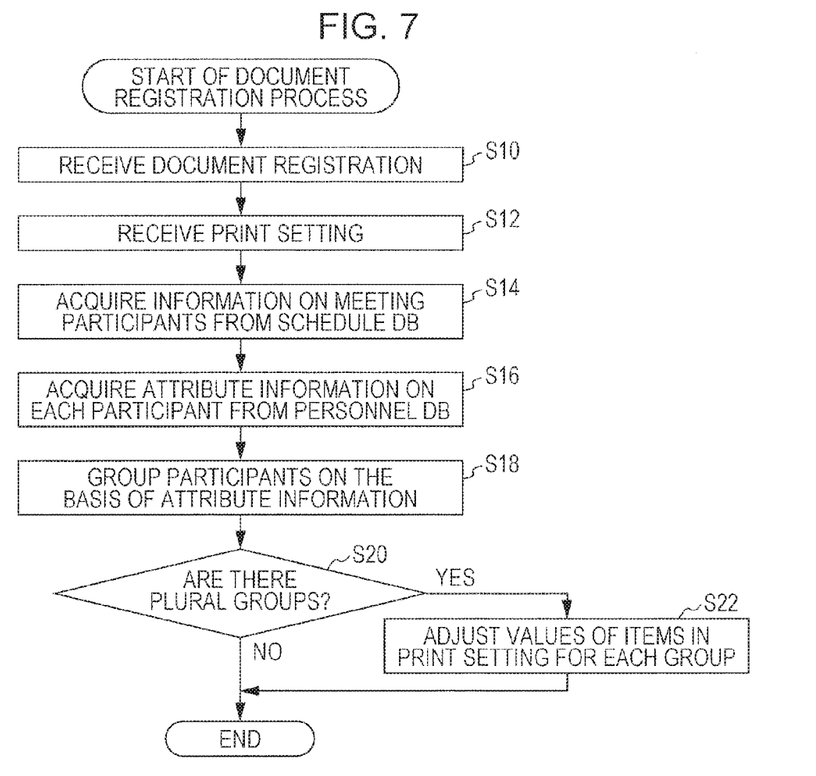
FIG. 7 illustrates an example of a process procedure performed when a print server according to the exemplary embodiment has received document registration.

The registered document is not necessarily printed immediately after the process for document registration illustrated in FIG. 7 is completed. For example, a meeting and a meeting material may be registered in the schedule DB 30 several weeks before the holding of the meeting. In this case, the document as the meeting material is often printed immediately before the date of the holding of the meeting, for example, which is quite a time after the registration. In the course of the time since the registration of the document, the attribute (e.g. department and title) of the meeting participants may be changed, and the participating members of the meeting may be changed. Thus, in the exemplary embodiment, the print setting etc. for each participant is maintained in accordance with such changes. An example of the procedure for the maintenance process will be described with reference to FIG. 10.

The print server 10 executes the process in FIG. 10 for each document for a meeting that has been registered. The process stands by until a stand-by time of a length determined in advance elapses since the time of the registration of the document or the time of execution of the last maintenance (S24). The length of the stand-by time may be one day or half a day (such examples are non-limiting as a matter of course), for example. When the stand-by time elapses, the print server 10 first accesses the schedule DB 30 to acquire meeting information (in particular, a list of participants in the meeting) corresponding to the meeting ID in the management information (see FIG. 8) on the document (S26). In addition, the print server 10 acquires attribute information corresponding to the employee number of each participant included in the participant list from the personnel DB 20 (S28). Next, the participant list acquired in S26 is compared with the participant list included in the management information on the document, and it is determined whether or not there has been any participant newly added to or deleted from the members of the meeting (S30). In the case where the determination result is Yes, and in the case where a new participant has been added, it is determined, on the basis of the attribute information on the new participant, which group in the level adjustment rules (FIG. 6) the new participant belongs to (S32). Next, the print setting to be applied to the new participant is determined by adjusting the default print setting for the level adjustment corresponding to the determined group, and the determined print setting is registered in management information (see FIG. 9) newly prepared for the new participant (S34). In the case where a participant has been deleted from the meeting members, meanwhile, the management information (FIG. 9) on the user is deleted (S36). Thereafter, the process proceeds to S38.

In the case where it is determined in S30 that there has not been any added or deleted participant, meanwhile, the process proceeds to S38.

Further, in S38, a comparison is made, for each participant, between the attribute information at the time of the last maintenance stored in the management information (FIG. 9) on the user and the attribute information acquired in S28 to determine whether or not any change has been made. For a participant, the attribute information on whom has been changed, it is determined, on the basis of the attribute after the change, which group in the level adjustment rules (FIG. 6) the participant belongs to, and it is determined whether or not the determined group to which the user now belongs is different from the group to which the user has belonged before. For a participant whose group has been changed, the default print setting is adjusted for the level adjustment corresponding to the group after the change to determine the print setting to be applied to the participant, and the management information (see FIG. 9) on the participant is changed in accordance with the determined print setting (S40). For a participant whose group has not been changed, the process in S40 is skipped.

After S38 (determination result: No) or S40, the process returns to S24, and the above process is repeatedly performed.

As a result of the maintenance process procedure in FIG. 10, the print setting for the document for each participant managed by the print server 10 is maintained so as to reflect the latest status (attribute information) of the participant. In addition, print setting for a participant who has been newly added to in a meeting is automatically determined and managed.

The print server 10 receives, from a user (meeting participant) who operates the image processing device 60, an instruction to print a document stored in the print server 10 in correlation with the user. For example, when the user operates the image processing device 60 to access the print server 10, a user authentication process is performed, and the user is successfully authenticated in the case where authentication information (e.g. the employee number and a password) input by the user is correct. In this case, the print server 10 provides the image processing device 60 with a list of documents stored in correlation with the employee number of the user. The user selects a document that he/she desires to print at that time from the document list displayed on an operation screen of the image processing device 60, and inputs an instruction to execute printing. Then, upon receiving the instruction, the print server 10 transmits, to the image processing device 60, the selected document and the print setting (see FIG. 9) stored in correlation with a combination of the employee number and the document. The image processing device 60 receives the document and the print setting, and prints the document in accordance with the print setting. In the exemplary embodiment, as a result of the maintenance process in FIG. 10, printing is executed using the print setting reflecting the latest attribute of the participant at the time when the print instruction is received.

There may be a case where a participant in a meeting requests another person to attend the meeting as a proxy for him/her and the proxy participant prints a document for the meeting using the image processing device 60 before the meeting. In such a case, it is desirable that the print setting for the document to be printed should correspond to the attribute (such as department and title) of the original participant, rather than the attribute of the proxy participant. A modification that meets such a need will be described below.

In the modification, a participant in a meeting accesses meeting information on the meeting registered in the schedule DB 30, and inputs a proxy participant who acts as a proxy for him/her. In this case, the schedule DB 30 stores the employee number of the proxy participant in correlation with the (original) participant in the meeting information.

Figure 11:
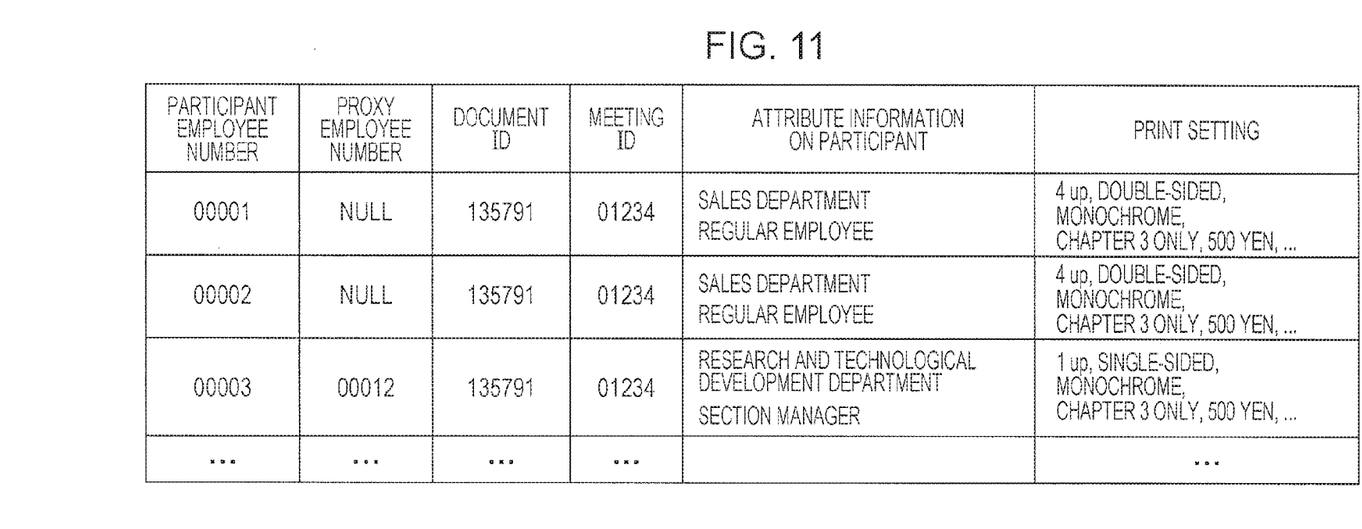
FIG. 11 illustrates an example of management information for meeting participants including an item for a proxy participant.

In the case where a proxy participant is set in information on a certain participant in the meeting information acquired from the schedule DB 30 in S26 of the maintenance process in FIG. 10, the print server 10 registers the employee number of the proxy participant in the management information on the participant for a document for the meeting managed by the print server 10. FIG. 11 illustrates an example of participant management information including an item for a proxy participant. As seen from a comparison with FIG. 9, the management information in FIG. 11 is obtained by adding the field of a proxy participant employee number ("proxy employee number" in FIG. 11) to the management information in FIG. 9. For example, while a proxy participant is not set for the participants with employee numbers of "00001" and "00002", a user with an employee number of "00012" is designated as a proxy participant for the participant with an employee number of "00003".

The modification is peculiar in the process performed in the case where the proxy participant provides, from the image processing device 60, the print server 10 with an instruction to print a document. In this case, the print server 10 extracts not only a document for which the employee number of the user who has logged in is registered as the original participant ("participant employee number" in FIG. 11) but also a document for which the employee number is registered in the "proxy employee number", and sends a list of the extracted documents to the image processing device 60. Then, the print server 10 sends a document selected by the user to the image processing device 60 along with information on the print setting correlated with the document to allow the image processing device 60 to print the document. In the case where the document selected by the user is a document for which the user is set as a proxy participant, the print setting correlated with the document has been determined on the basis of the attribute of the original participant, rather than the attribute of the user (proxy participant), and thus the document is printed using the print setting for the original participant.

In the example described above, user authentication is performed when a user logs in to the print server 10 from the image processing device 60. However, this is merely exemplary. A scheme in which user authentication is not required when a user provides the print server 10 with a print instruction (request for a document and print setting) from the image processing device 60 may also be used. Examples of such a scheme include a scheme in which a reservation number is used.

Figure 12:
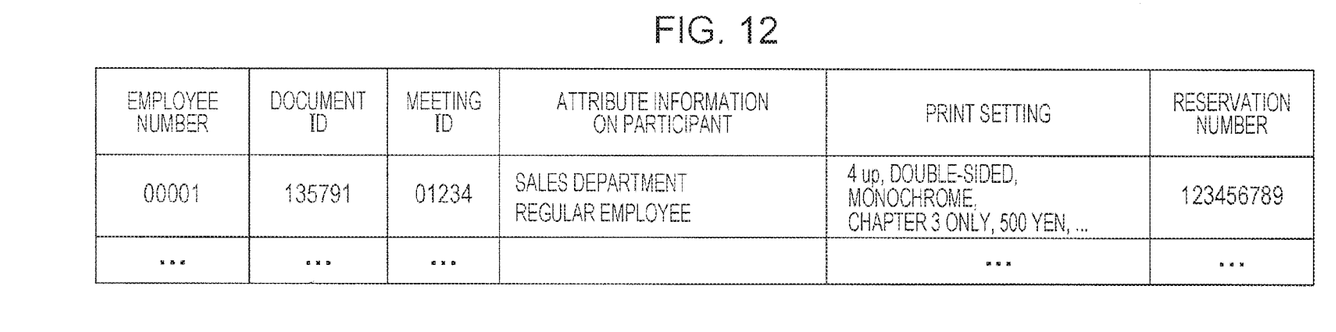
FIG. 12 illustrates an example of management information for meeting participants including an item for a reservation number.

In such a scheme, a user logs in to the print server 10 from the user PC 40 which is provided in the same intranet as the print server 10, and, upon user authentication, designates a document for a meeting in which the user will participate stored in the print server 10 to reserve printing. Upon receiving the reservation, the print server 10 generates a unique reservation number, and notifies the user of the reservation number by electronic mail or the like. At this time, the print server 10 registers the reservation number in the management information corresponding to the document for the user (meeting participant). FIG. 12 illustrates an example of participant management information including the field of a reservation number. The management information is obtained by adding the field of a reservation number to the management information illustrated in FIG. 9.

When the user inputs the reservation number provided from the print server 10 to the image processing device 60, the reservation number is sent to the print server 10. The print server 10 obtains a document to be printed and print setting from the management information (see FIG. 12) corresponding to the received reservation number, and sends information on the obtained document and print setting to the image processing device 60. The image processing device 60 prints the received document in accordance with the received print setting.

In the scheme in which a reservation number is used, a service that is similar to that in the exemplary embodiment described above may be provided to the image processing device 60 which is provided outside the intranet to which the print server 10 is connected even without the need to input authentication information such as the employee number and a password.

In this scheme, in the case where a participant designates a proxy participant, the proxy participant may print a document using the image processing device 60 exactly as the original participant if the participant acquires a reservation number from the print server 10 and notifies the proxy participant of the reservation number.

In the example described above, the print server 10 determines print setting that matches the attribute of each participant in a meeting when a document for the meeting is registered, thereafter regularly checks whether the attribute of each participant has not been changed, and in the case where any change has been made, has the change reflected in the print setting. However, this is merely exemplary. Instead of regularly updating the print setting, the attribute of a user (such as a participant) at the time when he/she makes a request to print a document for a meeting from the image processing device 60 may be obtained, when such a request is made, to determine print setting to be applied to the user on the basis of the attribute of the user.

In the exemplary embodiment described above, print setting corresponding to the attribute of each participant is determined by referring to the print setting level definitions (FIG. 5) and the level adjustment rules (FIG. 6) on the basis of the default print setting designated by the user. However, this is merely exemplary. Instead, the person of registration of a document may individually designate print setting to be applied to each group defined in the level adjustment rules (FIG. 6), for example. In this case, the print server 10 may store print setting for each designated group in correlation with the document ID, and determine the print setting stored in correlation with the group to which a participant belongs as the print setting to be applied to the participant in S22 of FIG. 7 and S34 of FIG. 10.

In the example described above, a person of registration who has newly registered a meeting in the schedule DB 30 registers a document to be used in the meeting. As a matter of course, however, a participant in the meeting may also register a document. In this case, the employee number of the user who has registered the document, rather than the person of registration of the meeting, (or both the person of registration of the meeting and the person of registration of the document) may be registered in the information on the "person of registration" in the management information (FIG. 8) on the document managed by the print server 10.

A scene in which a participant prints a document for a meeting has been described above. However, the techniques according to the exemplary embodiment and the modification described above may also be applied to events other than meetings. That is, the techniques according to the exemplary embodiment and the modification described above may generally be applied to cases where a document to be used in an event in which one or more participants will participate is registered so that the participants download and print the registered document.

In the example described above, the timing when a participant (or a proxy for the participant) may instruct the print server 10 to print (download) a document using the image processing device 60 is not specifically limited. However, such a timing may also be limited. For example, an instruction to print a document may be received only after a time designated by the user who registered the meeting or the document elapses. The timing when it becomes possible to receive a print instruction may be designated with reference to the time to start an event such as a meeting (for example, a time earlier than the start time by a time determined by the user may be designated as the timing).

The print server 10 described above is implemented by causing a general-purpose computer to execute a program that represents the processes discussed above. Here, the computer has a circuit configuration in which, for example, pieces of hardware such as a microprocessor such as a CPU, a memory (primary storage) such as a random-access memory (RAM) and a read-only memory (ROM), a hard disk drive (HDD) controller that controls an HDD, various input/output (I/O) interfaces, and network interfaces that control connection with a network such as a local area network are connected via a bus, for example. A disk drive that reads data from and/or writes data into a portable disc recording medium such as a compact disk (CD) and a digital versatile disk (DVD), a memory reader/writer that reads data from and/or writes data into a portable non-volatile recording medium according to various standards such as a flash memory, etc. may be connected to the bus by way of the I/O interfaces, for example. A program that describes the content of processes performed by the functional modules described above is stored in a stationary storage device such as the hard disk drive to be installed on the computer by way of a recording medium such as a CD and a DVD or by way of a communication unit such as a network. The program stored in the stationary storage device is read by the RAM and executed by the microprocessor such as the CPU to implement the group of functional modules described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to execute:
a reception unit configured to receive registration of a document to be printed, the document being registered in correlation with an event;
an attribute acquisition unit configured to acquire attribute information on each of a plurality of participants in the event corresponding to the document to be printed, the attribute information being acquired from a user attribute storage device that stores attribute information on each person at a determination timing when print setting for the participant for the document to be printed is determined; and
a determination unit configured to determine, in response to receiving a request from a first participant requesting to print the document for the event, a print setting to be applied to the document to be separately printed for the first participant and a second participant in the event, using the attribute information on the first participant and the second participant acquired by the attribute acquisition unit and using level adjustment rules defining a relationship between the first participant and the second participant.

2. The information processing apparatus according to claim 1, wherein the at least one processor is further configured to execute:
a participant information acquisition unit configured to acquire information on the participant in the event corresponding to the document to be printed, the information being acquired from an event information storage device that stores information on the participant who participates in each event at the determination timing,
wherein the attribute acquisition unit is further configured to acquire, from the user attribute storage device, attribute information on each participant indicated by the information acquired by the participant information acquisition unit.

3. The information processing apparatus according to claim 1, wherein the at least one processor is further configured to execute:
a storing unit configured to store a proxy who participates in the event as a proxy for the participant, the proxy being stored in correlation with the participant; and
a providing unit configured to provide print setting determined by the determination unit for the participant corresponding to the proxy in a case where a user who has issued an instruction to print the document to be printed from an image processing device is the proxy, the print setting being provided to the image processing device in correlation with the document to be printed.

4. The information processing apparatus according to claim 1, wherein a value corresponding to the print setting for the second participant is increased from a default value to a higher value on the basis of the level adjustment rules defining the relationship between the first participant and the second participant.

5. An information processing method comprising:
receiving registration of a document to be printed, the document being registered in correlation with an event;
acquiring attribute information on each participant in the event corresponding to the document to be printed, the attribute information being acquired from a user attribute storage device that stores attribute information on each person at a determination timing when print setting for the participant for the document to be printed is determined; and
determining, in response to receiving a request from a first participant requesting to print the document for the event, a print setting to be applied to the document to be separately printed for the first participant and a second participant in the event, using the attribute information on the first participant and the second participant acquired in the acquiring and using level adjustment rules defining a relationship between the first participant and the second participant.

6. The information processing method according to claim 5, wherein a value corresponding to the print setting for the second participant is increased from a default value to a higher value on the basis of the level adjustment rules defining the relationship between the first participant and the second participant.

7. A non-transitory computer readable medium storing a program causing a computer to perform a process comprising:
receiving registration of a document to be printed, the document being registered in correlation with an event;
acquiring attribute information on each participant in the event corresponding to the document to be printed, the attribute information being acquired from a user attribute storage device that stores attribute information on each person at a determination timing when print setting for the participant for the document to be printed is determined; and
determining, in response to receiving a request from a first participant requesting to print the document for the event, a print setting to be applied to the document to be separately printed for the first participant and a second participant in the event, using the attribute information on the first participant and the second participant acquired in the acquiring and using level adjustment rules defining a relationship between the first participant and the second participant.

8. The non-transitory computer readable medium according to claim 7, wherein a value corresponding to the print setting for the second participant is increased from a default value to a higher value on the basis of the level adjustment rules defining the relationship between the first participant and the second participant.

* * * * *